United States Patent
MacKay

[11] Patent Number: 5,944,060
[45] Date of Patent: Aug. 31, 1999

[54] COMPOSITE DUCT SYSTEM

[75] Inventor: Michael D. MacKay, Tulsa, Okla.

[73] Assignee: Boeing North American, Inc., Seal Beach, Calif.

[21] Appl. No.: 08/578,129

[22] Filed: Dec. 26, 1995

[51] Int. Cl.$^6$ .................................................. F16L 9/14
[52] U.S. Cl. .................. 138/140; 138/137; 138/141; 138/DIG. 9; 138/DIG. 7
[58] Field of Search ........................... 138/149, 148, 138/140, 137, 141, DIG. 9, DIG. 7

[56] References Cited

U.S. PATENT DOCUMENTS

| | | | |
|---|---|---|---|
| 3,665,968 | 5/1972 | De Putter | 138/141 |
| 4,036,617 | 7/1977 | Leonard et al. | 62/55 |
| 4,080,999 | 3/1978 | Bulters et al. | 138/137 X |
| 4,081,302 | 3/1978 | Drostholm et al. | 156/190 |
| 4,248,062 | 2/1981 | McLain et al. | 138/30 X |
| 4,307,756 | 12/1981 | Voight et al. | 138/DIG. 9 X |
| 4,432,396 | 2/1984 | Daussan et al. | 138/109 |
| 4,516,608 | 5/1985 | Titus et al. | 138/140 |
| 4,590,971 | 5/1986 | Webster et al. | 138/149 |
| 4,660,861 | 4/1987 | Argy et al. | 285/45 |
| 4,706,711 | 11/1987 | Czvikovszky et al. | 138/149 X |
| 4,942,903 | 7/1990 | Jacobsen | 138/137 X |
| 4,968,545 | 11/1990 | Fellman et al. | 428/361 |
| 5,298,299 | 3/1994 | Shea | 138/149 X |
| 5,309,620 | 5/1994 | Shinohara et al. | 29/432 |
| 5,379,806 | 1/1995 | Matthews et al. | 138/149 |
| 5,383,994 | 1/1995 | Shea | 156/175 |
| 5,575,312 | 11/1996 | Schroeder | 138/149 |
| 5,629,062 | 5/1997 | Ejiri et al. | 138/143 X |

FOREIGN PATENT DOCUMENTS

| | | |
|---|---|---|
| 0 219 068 | 4/1987 | European Pat. Off. . |
| 0 422 281 | 4/1991 | European Pat. Off. . |
| 0 472 293 A1 | 2/1992 | European Pat. Off. . |
| 2 221 140 | 11/1973 | Germany . |
| 39 25 781 | 2/1991 | Germany . |
| 91 11 372 U | 12/1991 | Germany . |
| WO 96/21822 | 7/1996 | WIPO . |

*Primary Examiner*—Patrick Brinson
*Attorney, Agent, or Firm*—Lawrence N. Ginsberg

[57] ABSTRACT

The composite duct system includes a first, duct portion; a second, duct foam portion; and, a third duct portion. The first duct portion has a first surface for permitting a flowable medium to be conveyed adjacent thereto, and a second surface. The first duct portion is formed with a first fiber reinforced resin system. The second duct foam portion has a first surface bonded to the second surface of the first duct portion. The foam portion is formed of fire retarding material derived from a resin system. The third duct portion has a first surface bonded to a second surface of the foam portion. The third duct portion is formed of a second fiber reinforced resin system. Thus, a system is created having an internally sandwiched foam insulation.

32 Claims, 4 Drawing Sheets

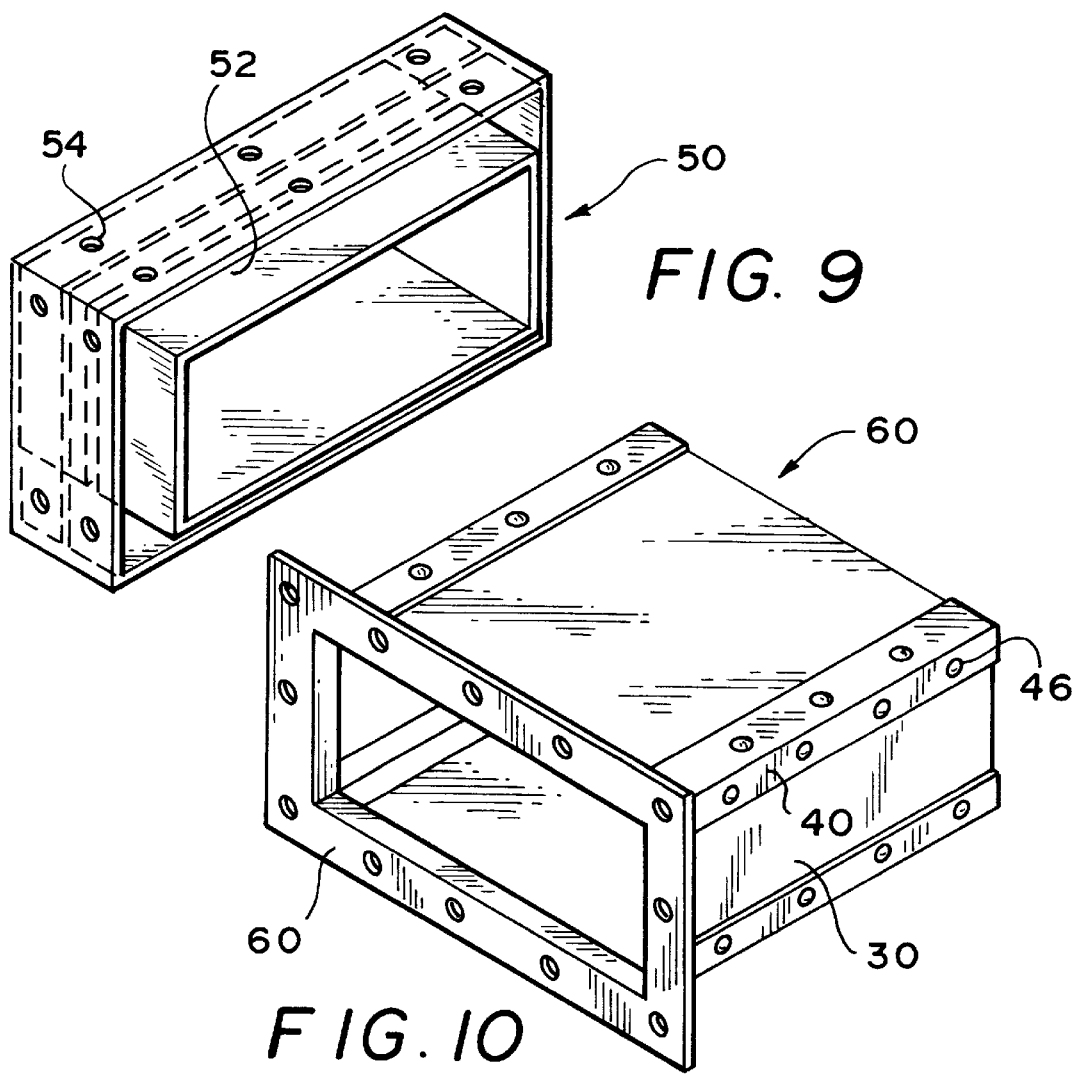
FIG. 9
FIG. 10
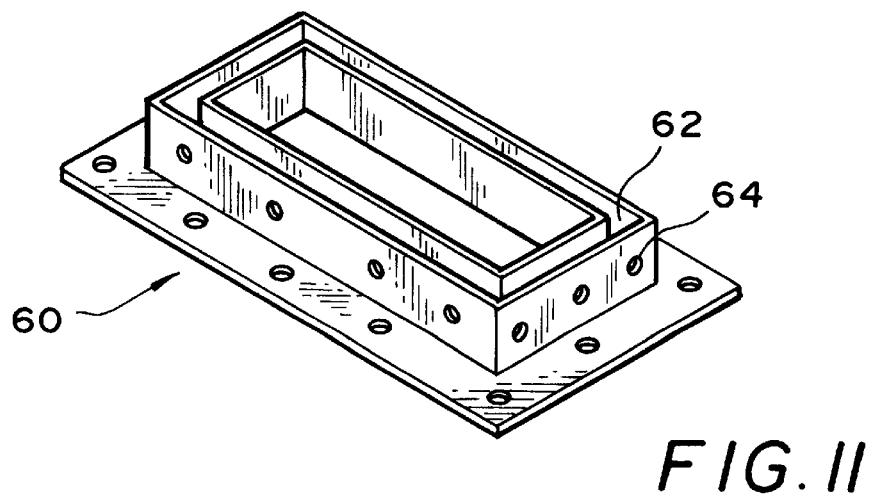
FIG. 11

COMPOSITE DUCT SYSTEM

BACKGROUND OF THE INVENTION

1. Field of the Invention

The present invention relates to ducting systems and more particularly to a ventilation duct system formed of composite materials.

2. Description of the Related Art

Frequent ventilation duct replacement is required on ships (every 6 months on some ships) due to salt air/water corrosion. Labor intensive construction, massive weight of materials, frequent ship lay-up for repairs, poor air quality/delivery to interior shipboard compartments, heavy loads on distribution equipment, expansion/contraction, and noise are the generations-old problems currently associated with metallic ducting.

Chemical plants, oil refineries and other industrial plants suffer from similar problems relative to corrosion in the ducting systems in these environments. Furthermore, hospital ducting systems are problematic relative to bacterial contamination. All of these systems have the inherent corrosion build-up problem because metal ducting condenses moisture. External installation on the metal ducts further encapsulates this moisture, which further propagates the corrosion problem.

Use of materials other than metals in ducting systems has heretofore been very limited because of the fire hazards involved with such other materials.

OBJECTS AND SUMMARY OF THE INVENTION

It is, therefore, a principal object of the present invention to resolve corrosion problems presently associated with presently used metallic ducting systems.

It is another object to provide a ducting system which is flame resistant and fire retardant.

It is yet another object to obviate the need for externally applied insulation.

These and other objects are achieved by the present invention, which is, in a broad aspect, a composite system for use in forming a ducting system.

The composite duct system includes a first, duct portion; a second, duct foam portion; and, a third duct portion. The first duct portion has a first surface for permitting a flowable medium to be conveyed adjacent thereto, and a second surface. The first duct portion is formed with a first fiber reinforced resin system. The second duct foam portion has a first surface bonded to the second surface of the first duct portion. The foam portion is formed of fire retarding material derived from a resin system. The third duct portion has a first surface bonded to a second surface of the foam portion. The third duct portion is formed of a second fiber reinforced resin system. Thus, a system is created having an internally sandwiched foam insulation.

The fiber reinforced resin systems may be comprised of, for example, phenolic resin systems. The resin systems preferably further include fire retardant additives. Furthermore, they may include additives for enabling ambient curing without the need for thermosetting. Such an additive, by way of example, is the additive marketed under the trademark RESORCINAL™. The fibers in the systems may be organic, such as graphite or derivatives of carbon, or aramid fibers, or inorganic, such as fiberglass, quartz or NEXTEL™. The composite system may be formed in the shape of panel subassemblies, which may be connectable to form rectangular ducts or may be formed with circular cross-sections to form cylindrical ducts.

The ducting system of the present invention is particularly useful on ships, which are exposed to the salt/sea environment.

BRIEF DESCRIPTION OF THE DRAWINGS

FIG. 9 is a perspective view of an extension fitting for a rectangular duct.

FIG. 10 is a perspective view of a flanged end fitting attached to corner brackets and panel subassemblies.

FIG. 11 is a perspective view of a flanged end fitting unattached to corner brackets and panel subassemblies.

The same elements or parts throughout the figures are designated by the same reference characters.

DETAILED DESCRIPTION OF THE PREFERRED EMBODIMENT

Figure 1:
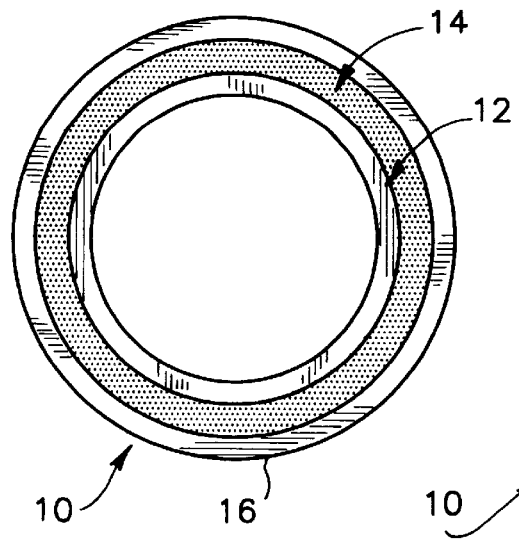
FIG. 1 is an end view of a first embodiment of the present invention in which the duct system has a circular cross-section.
Figure 2:
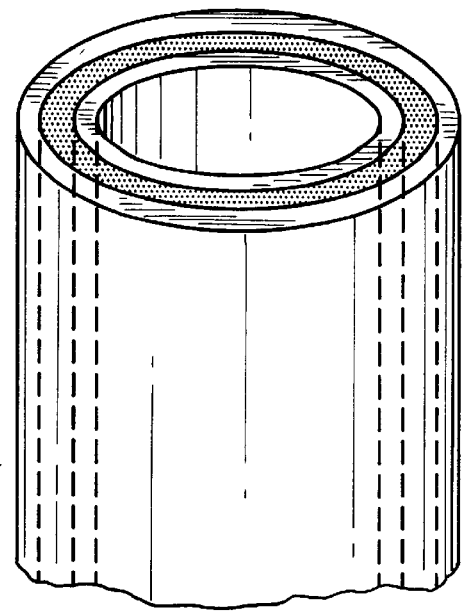
FIG. 2 is a perspective view of the duct system of FIG. 1.

Referring now to the drawings and the characters of reference marked thereon, FIGS. 1 and 2 illustrate a first preferred embodiment of the present invention, designated generally as 10. Apparatus or duct system 10 includes an inner, cylindrical duct portion 12, a cylindrical foam portion 14 disposed in surrounding relationship to the inner duct portion 12, and an outer cylindrical duct portion 16 in surrounding relationship to the foam portion 14. The inner duct portion and the outer duct portion are formed of fiber reinforced resin systems. Such fiber reinforced resin systems may be formed of, for example, epoxies, phenolics, vinyl esters, polyimides, or bismaleimides. These resin systems preferably include fire retardants additives such as Bromine, Antimony, Phosphorus or silicones.

The fiber reinforced resin systems may comprise organic fiber systems or inorganic fiber systems. Examples include fiberglass, graphite, KEVLAR® and other aramid fibers. The fibers may be in the form of various textures, i.e. the textures may range from broad goods to chopped fibers.

The foam portion 14 is formed of fire retarding material derived from a resin system. The foam may be derived from the resin systems described above. The density of the foam may range from about 1 to about 40 lbs. per cubic foot, preferably in a range of between 2 and 10 lbs. per cubic foot.

The tubes for forming components 12, 14 and 16 can be formed through a pultrusion process or by lay-up on an axially spinning mandrel. The tubes are spaced concentrically by use of phenolic spacer plugs circumferentially and equidistantly spaced in the space formed between the tubes. These phenolic plugs support the inner tube, structurally, within the outer tube. The spacing is critical so that when foam is added, the inner tube is not pushed off-axis. The phenolic plugs also provide stability for the inner tube while foam is being applied. The foam can be poured or chemically blown into the space between the tubes.

Figure 3:
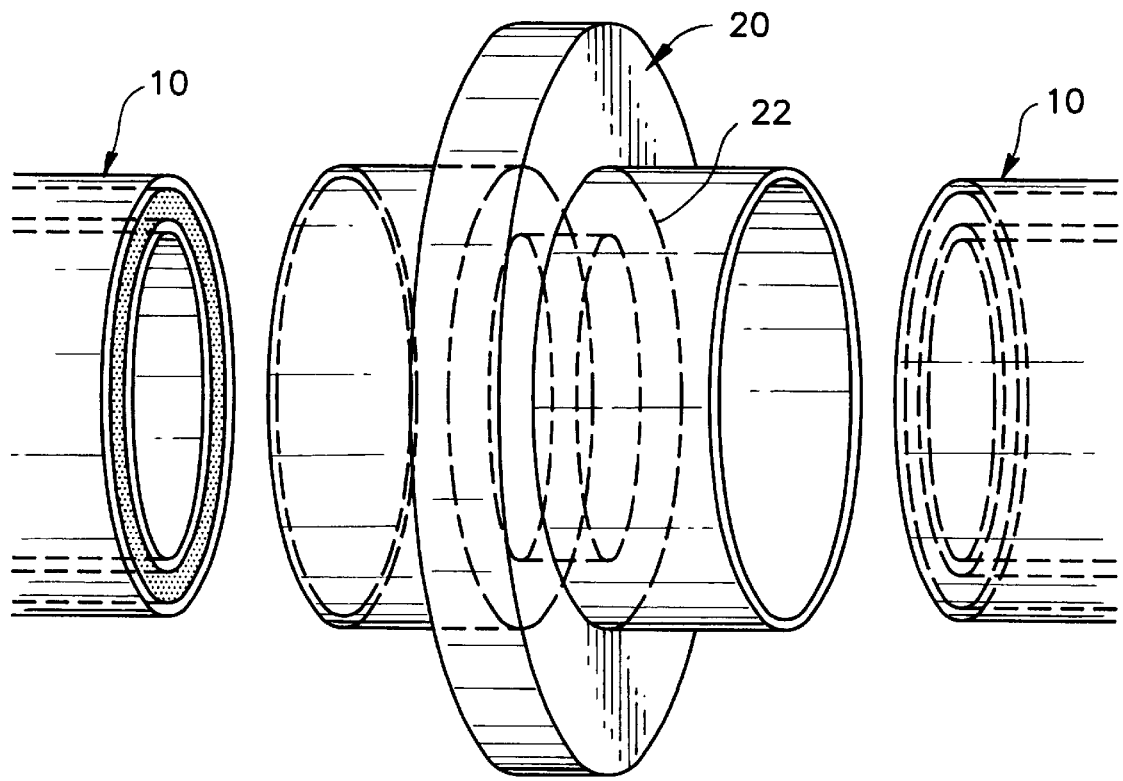
FIG. 3 is an exploded perspective view of two cylindrical ducts being attached by a connector fitting.

Referring now to FIG. 3, two cylindrical ducts 10 are shown being attached by a connector fitting, designated generally as 20. The connector fitting 20 is formed from a fiber reinforced resin system, such as a system discussed above with respect to the tubes. Each tube assembly 10 is inserted into the connector to the position 22, shown by phantom lines. The tube assemblies 10 are each bonded along their outer surfaces to the internal surfaces of the connector fitting 20.

Figures 4, 5:
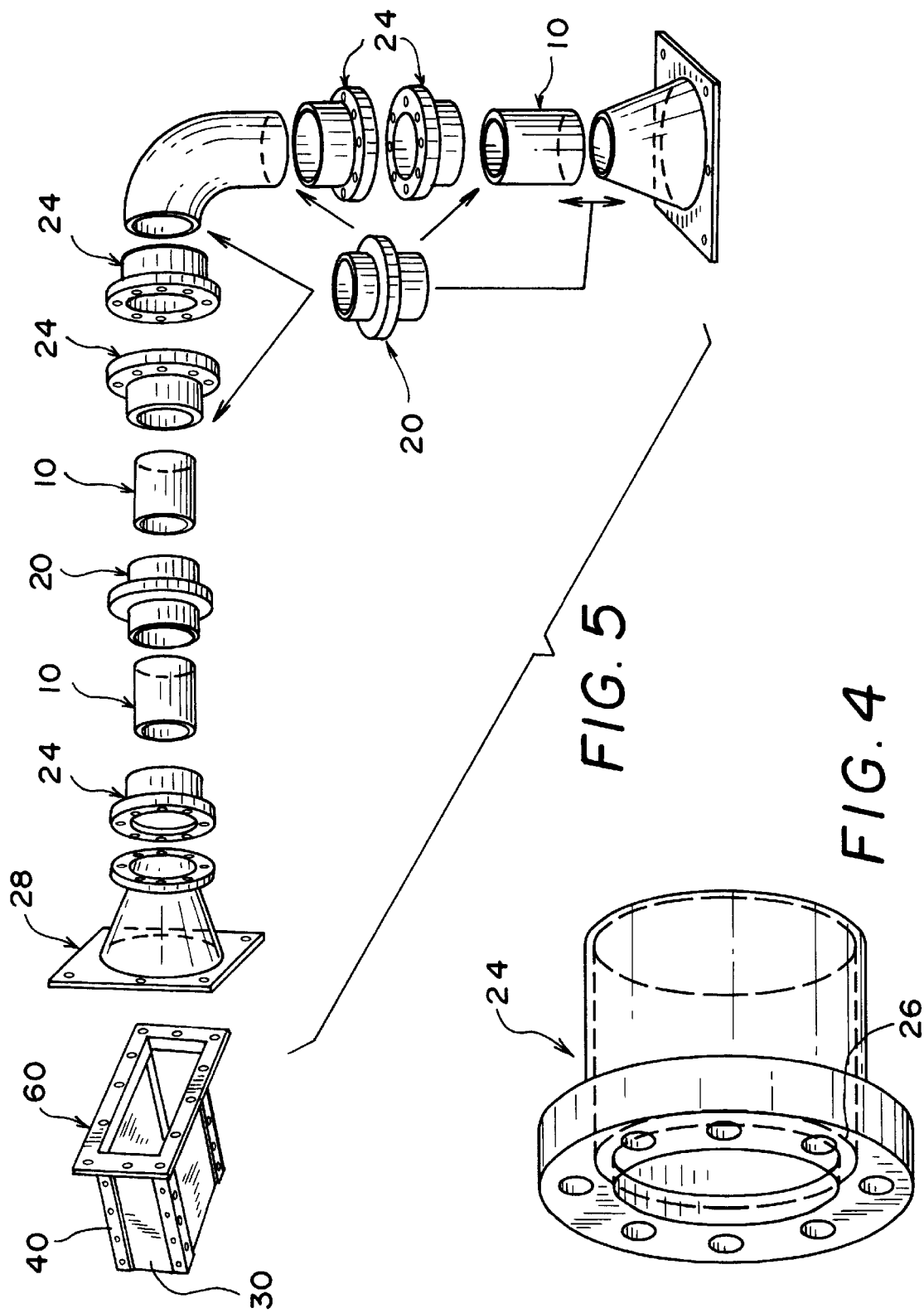
FIG. 4 is a perspective view of a flanged end fitting for use with the cylindrical ducts of FIGS. 1 and 2.
FIG. 5 is an exploded perspective of a plurality of ducts and fittings in accordance with the principles of the present invention.

Referring now to FIG. 4, a flanged end fitting, designated generally as 24, is illustrated. The tube assembly 10 may be inserted to about position 26, shown by phantom lines. The flanged end fitting 24 is used for connecting round ducts to other shapes/size ducts.

Referring now to FIG. 5, a plurality of ducts and fittings are illustrated to typify how they may be arranged and assembled with various transitions. Transition fittings may be utilized to adapt different shaped ducts to each other. For example, transition fitting 28, demonstrates a transition between a rectangular ducting system 60 (discussed below) and a round ducting system.

Figure 6:
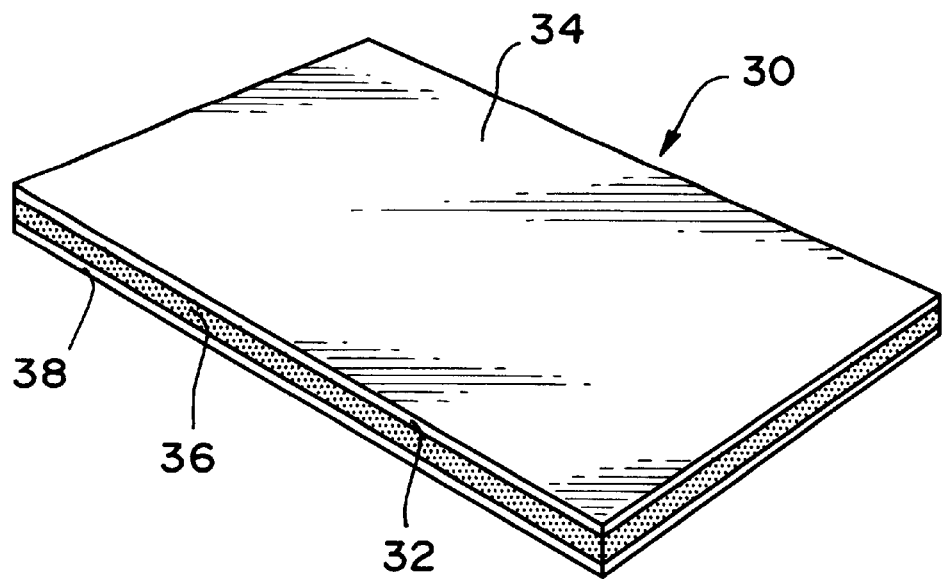
FIG. 6 is a perspective view of a second embodiment of the present invention in form of a panel subassembly.

Referring now to FIG. 6, another preferred embodiment of the present invention in the form of a panel subassembly is illustrated, designated generally as 30. Each panel subassembly 30 includes a first duct portion 32 having a first surface 34 for permitting a flowable medium to be conveyed adjacent thereto and a second surface. A second duct foam portion 36 has a first surface bonded to the second surface of the first duct portion 32. A third duct portion 38 has a first surface bonded to a second surface of the foam portion 36. The third duct portion 38 and the first duct portion 32 are each formed of fiber reinforced resin systems. The foam portion 36 is formed of fire retarding material derived from a resin system. These resin systems are the same as described above, with respect to the round ducts of FIGS. 1 and 2.

Figure 7:
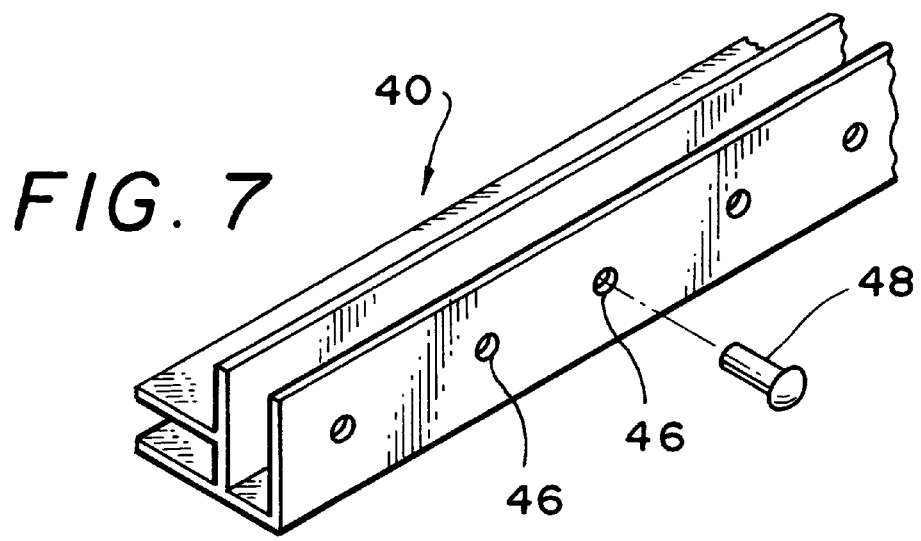
FIG. 7 is a perspective view of a corner bracket and a pin used for securing panel subassemblies to the corner bracket.
Figure 8:
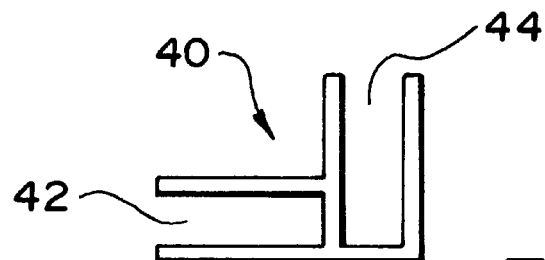
FIG. 8 is an end view of the corner bracket of FIG. 7.

FIGS. 7 and 8 illustrate a corner bracket 40, which are used for securing panel subassemblies 30 together so as to form an integral duct system. Two panel subassemblies are secured within channels 42, 44 of each corner bracket 40. The corner brackets 40 are preferably formed by a pultrusion process. They are also preferably formed of the same fiber reinforced resin systems as their mating components. Holes 46 in the corner brackets provide access to pins 48 for securing the panel subassemblies 30 to the corner brackets 40.

Referring now to FIG. 9, an extension fitting for a rectangular duct is illustrated, designated generally as 50. The extension fitting 50 is used for connecting panel subassemblies 30 for lengths, as desired, for specific purposes. After the panel subassemblies 30 are connected via corner brackets 40 to form an integral unit, this unit is then inserted into slots 52. Holes 54 are provided for securement via pins (not shown). The extension fitting 50 is preferably formed by resin transfer molding or vacuum compression molding.

Referring now to FIG. 10, a flanged end fitting for attachment of a duct to another shape/size duct is shown, designated generally as 60. The flanged end fitting 60 is shown attached to corner brackets 40 and panel subassemblies 30. FIG. 11 shows the panel subassemblies 30 and corner brackets 40 unconnected to the flanged end fitting 60. The panel subassemblies 30 and brackets 40 fit within the channels 62 formed in the fitting 60. Holes 64 are provided for fastening these assemblies via pins, as discussed above, with respect to the corner brackets. The flanged end fittings 60 may be formed by vacuum compression molding or resin transfer molding.

There are many applications to which the principles of the present invention may be applied. A specific, particularly advantageous application of these principles is with respect to ships. The water and salt environment presents difficult problems with presently used metal ducting systems. Ducts fabricated in accordance with the principles of the present invention, can meet all of the published Navy guidelines, with respect to smoke, fire retardancy, toxicity, vibration and impact criteria. With respect to vibrational attributes, it is noted that composites have a natural dampening effect, far greater than metal. These composites do not rust or corrode. Their life cycle times are on an order of magnitude higher than current metal ducting systems. The ducting system of the present invention provides far superior air quality to interior shipboard compartments than metal ducts. The present invention provides decreased loads on distribution equipment due to its greater efficiency. Furthermore, the ducting systems of the present invention greatly reduce noise.

The ducting systems of the present invention are much simpler to install than ducting systems of the prior art. They are much lighter, generally less than half the weight of similar steel ducts. It is noted that there is a particular benefit in reducing top-side structure weight on ships. These ducts require no welding. They require the use of relatively simple bonding techniques.

The ducting systems of the present invention are also particularly useful in oil field or oil refinery operations. In such applications, corrosion is a particular problem. The internal sandwiching of the foam insulation lends itself to many unique applications, where external wrapping is a problem.

Sterile environments are required in hospitals and laboratories and clean rooms. The present invention provides the clean air necessary in such environments. Composite materials do not lend themselves to mold formation and do not rot.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A composite system for use in forming a duct system comprising:
   a) a first duct portion having a first surface for permitting a flowable medium to be conveyed adjacent thereto and a second surface, said first duct portion being formed of a first fiber reinforced resin system;
   b) a second duct foam portion having a first surface bonded to said second surface of said first duct portion, said foam portion being formed of fire retarding material derived from a resin system, said fire retarding material being in a density range of about 1 to about 40 lbs. per cubic feet; and,
   c) a third duct portion having a first surface bonded to a second surface of said foam portion, said third duct portion being formed of a second fiber reinforced resin system.

2. The composite system of claim 1, wherein said first fiber reinforced resin system comprises a phenolic resin system.

3. The composite system of claim 2, wherein said phenolic resin system further comprises an additive for enabling said phenolic resin system to be ambiently cured without the requirement of thermosetting.

4. The composite system of claim 2, wherein said first fiber reinforced resin system further comprises a fire retardant additive.

5. The composite system of claim 1, wherein said first fiber reinforced resin system comprises an organic fiber system.

6. The composite system of claim 1, wherein said first fiber reinforced resin system, comprises an inorganic fiber system.

7. The composite system of claim 6, wherein said inorganic fiber system comprises Fiberglass.

8. The composite system of claim 6, wherein said inorganic fiber system comprises graphite.

9. The composite system of claim 1, wherein said first fiber reinforced resin system comprises a polyimide resin system.

10. The composite system of claim 1, wherein said first fiber reinforced resin system comprises a bismaleimide resin system.

11. The composite system of claim 1, wherein said first fiber reinforced resin system comprises a vinyl ester resin system with a fire retardant additive.

12. The composite system of claim 1, wherein said first duct portion, said second duct foam portion and said third duct portion comprise a panel subassembly.

13. A duct system, comprising:
   a) an inner duct portion for permitting a flowable medium to be conveyed therethrough, said inner duct portion being formed of a first fiber reinforced resin system;
   b) a foam portion disposed in surrounding relationship to said inner duct portion, said foam portion being formed of fire retarding material derived from a resin system, said fire retarding material being in a density range of about 1 to about 40 lbs. per cubic feet; and
   c) an outer duct portion in surrounding relationship to said foam portion, said outer duct portion being formed of a second fiber reinforced resin system.

14. The duct system of claim 13, wherein said first fiber reinforced resin system comprises a phenolic resin system.

15. The duct system of claim 14, wherein said resin system further comprises an additive for enabling said phenolic resin system to be ambiently cured without the requirement of thermosetting.

16. The duct system of claim 14, wherein said first fiber reinforced resin system further comprises a fire retardant additive.

17. The duct system of claim 13, wherein said first fiber reinforced resin system comprises an organic fiber system.

18. The duct system of claim 13, wherein said first fiber reinforced resin system comprises an inorganic fiber system.

19. A duct system, comprising:
   four panel subassemblies, each panel subassembly comprising a composite system, comprising:
      a) a first duct portion having a first surface for permitting a flowable medium to be conveyed adjacent thereto and a second surface, said first duct portion being formed of a first fiber reinforced resin system;
      b) a second duct foam portion having a first surface bonded to said second surface of said first duct portion, said foam portion being formed of fire retarding material derived from a resin system; and,
      c) a third duct portion having a first surface bonded to a second surface of said foam portion, said third duct portion being formed of a second fiber reinforced resin system; and
   four corner brackets for securing said four panel subassemblies together so as to form an integral duct system.

20. The duct system of claim 19, further comprising end fittings, which fit over ends of said panel subassemblies for allowing a plurality of panel subassemblies to be joined for a desired duct system length.

21. A duct system for heating, ventilation and air conditioning for shipboard applications, comprising:
   a) a first duct portion having a first surface for permitting a flowable medium to be conveyed adjacent thereto and a second surface, said first duct portion being formed of a first fiber reinforced resin system;
   b) a second duct foam portion having a first surface bonded to said second surface of said first duct portion, said foam portion being formed of fire retarding material derived from a resin system, said fire retarding material being in a density range of about 1 to about 40 lbs. per cubic feet; and,
   c) a third duct portion having a first surface bonded to a second surface of said foam portion, said third duct portion being formed of a second fiber reinforced resin system.

22. The composite system of claim 21, wherein said first fiber reinforced resin system comprises a phenolic resin system.

23. The composite system of claim 21, wherein said phenolic resin system further comprises an additive for enabling said phenolic resin system to be ambiently cured without the requirement of thermosetting.

24. The composite system of claim 22, wherein said first fiber reinforced resin system further comprises a fire retardant additive.

25. The composite system of claim 21, wherein said first fiber reinforced resin system comprises an organic fiber system.

26. The composite system of claim 21, wherein said first fiber reinforced resin system, comprises an inorganic fiber system.

27. The composite system of claim 26, wherein said inorganic fiber system comprises Fiberglass.

28. The composite system of claim 27, wherein said inorganic fiber system comprises graphite.

29. The composite system of claim 21, wherein said first fiber reinforced resin system comprises a polyimide resin system.

30. The composite system of claim 21, wherein said first fiber reinforced resin system comprises a bismaleimide resin system.

31. The composite system of claim 21, wherein said first fiber reinforced resin system comprises a vinyl ester resin system with a fire retardant additive.

32. The composite system of claim 21, wherein said first duct portion, said second duct foam portion and said third duct portion comprise a panel subassembly.

\* \* \* \* \*